United States Patent
Kocamaz et al.

(10) Patent No.: US 12,272,152 B2
(45) Date of Patent: Apr. 8, 2025

(54) SINGLE AND ACROSS SENSOR OBJECT TRACKING USING FEATURE DESCRIPTOR MAPPING IN AUTONOMOUS SYSTEMS AND APPLICATIONS

(71) Applicant: NVIDIA Corporation, Santa Clara, CA (US)

(72) Inventors: Mehmet K. Kocamaz, San Jose, CA (US); Ke Xu, Los Angeles, CA (US); Sangmin Oh, San Jose, CA (US); Junghyun Kwon, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 578 days.

(21) Appl. No.: 17/551,986

(22) Filed: Dec. 15, 2021

(65) Prior Publication Data
US 2023/0186640 A1    Jun. 15, 2023

(51) Int. Cl.
| | |
|---|---|
| G06V 20/58 | (2022.01) |
| B60W 60/00 | (2020.01) |
| G06F 18/213 | (2023.01) |
| G06N 3/08 | (2023.01) |
| G06T 7/246 | (2017.01) |
| G06V 10/22 | (2022.01) |
| G06V 10/46 | (2022.01) |
| G06V 10/82 | (2022.01) |

(52) U.S. Cl.
CPC ........... *G06V 20/58* (2022.01); *B60W 60/001* (2020.02); *G06F 18/213* (2023.01); *G06N 3/08* (2013.01); *G06T 7/246* (2017.01); *G06V 10/225* (2022.01); *G06V 10/46* (2022.01); *G06V 10/82* (2022.01); *B60W 2420/403* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 10,885,698 B2 | 1/2021 | Muthler et al. | |
| 2021/0256293 A1* | 8/2021 | Poddar | G06V 10/75 |
| 2022/0284598 A1* | 9/2022 | Bhargava | G06V 20/48 |

(Continued)

OTHER PUBLICATIONS

Kocamaz, et al.; First Office Action for German Patent Application No. 10 2022 132 671.3, filed Dec. 8, 2022, mailed Jul. 18, 2023, 9 pgs.

(Continued)

*Primary Examiner* — Leon Flores
(74) *Attorney, Agent, or Firm* — Taylor English Duma L.L.P.

(57) ABSTRACT

In various examples, live perception from sensors of a vehicle may be leveraged to generate object tracking paths for the vehicle to facilitate navigational controls in real-time or near real-time. For example, a deep neural network (DNN) may be trained to compute various outputs—such as feature descriptor maps including feature descriptor vectors corresponding to objects included in a sensor(s) field of view. The outputs may be decoded and/or otherwise post-processed to reconstruct object tracking and to determine proposed or potential paths for navigating the vehicle.

20 Claims, 17 Drawing Sheets

(56) References Cited

U.S. PATENT DOCUMENTS

2022/0415051 A1* 12/2022 Sherman ............... G06V 10/82
2023/0060211 A1*  3/2023 Margarian ............. G06T 7/246

OTHER PUBLICATIONS

Voigtlaender, et al.; "MOTS: Multi-Object Tracking and Segmentation," in 2019 IEEE/CVF Conference on Computer Vision and Pattern Recognition (CVPR), Jun. 2019, 10 pgs.

Xue, et al.; "Pedestrian fusion tracking method based on multimodal information com-plementation," in 2021 International Conference on Computer Engineering and Application (ICCEA), Jun. 2021, 5 pgs.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

ISO 26262, "Road vehicle—Functional safety," International Standard for Functional Safety of Electronic System, Retrieved from Internet URL: https://en.wikipedia.org/wiki/ISO_26262, accessed on Sep. 13, 2021, 8 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

* cited by examiner $$b^t_{object1} = avg(v_0 + v_1 + v_8 + v_9 + v_{16} + v_{17})$$
$$b^t_{object2} = avg(v_{13} + v_{14} + v_{15} + v_{21} + v_{22} + v_{23} + v_{29} + v_{30} + v_{31})$$

FIGURE 6A

SINGLE AND ACROSS SENSOR OBJECT TRACKING USING FEATURE DESCRIPTOR MAPPING IN AUTONOMOUS SYSTEMS AND APPLICATIONS

BACKGROUND

Autonomous driving systems and advanced driver assistance systems (ADAS) may use sensors, such as cameras, LIDAR sensors, RADAR sensors, and/or the like, to perform various tasks—such as object detection, object tracking, lane keeping, lane changing, lane assignment, camera calibration, turning, path planning, and/or localization. For example, for autonomous and ADAS systems to operate independently and efficiently, an understanding of the surrounding environment of the machine must be achieved. This understanding may include information as to the locations of objects and the path or track of objects, and this information may be used by a machine when making path planning or control decisions—such as what path or trajectory to follow.

As an example, information regarding object location and object path in the environment of an autonomous or semi-autonomous machine is important when planning the machines path, avoiding objects, and/or making control decisions—such as where to stop, what path to use to safely traverse an intersection, where other vehicles or pedestrians may be located, and/or the like.

Traditional object tracking systems use either motion models or convolutional DNN based models, both of which rely heavily on object detectors. For example, some motion models use key points (such as a Scale Invariant Feature Transform (SIFT) algorithm and/or a Kanade-Lucas-Tomasi (KLT) feature tracker) within a bounding shape as feature descriptors. The motion model approach attempts to predict current bounding shape positions using previous key point positions and a pre-defined motion model, and tracking is achieved by computing the Intersection Over Union (IOU) score between the bounding shape positions predicted by the motion model and those predicted by the object detector. However, simple key points often fail to capture high level semantic features of individual objects. In other words, object tracking using motion models is highly dependent on the continuity and visibility of the key points. As a result, changes in camera viewpoint and partial observations often result in failure of tracking.

Similarly, motion models also fail when object movements do not follow the pre-defined motion model—e.g., tracking errors often occur when objects are close to each other or cross each other in opposite directions. For example, as a group of people cross a street in opposite directions, motion models can fail to accurately track the path of each person as some actors occlude others. These motion models often rely heavily on hand-tuned threshold values, such as minimum key point numbers and confidence thresholds, which need to be re-tuned for different road conditions and scenarios.

More recent approaches that rely on convolutional DNN-based models leverage the feature encoding power of the DNN to track objects. Generally, these DNN-based models are first trained as part of an object detection pipeline, and then a commercially available matching or association algorithm is used for post-detection tracking. However, neither the DNN features nor the association algorithm are optimized for object tracking which often results in object identification switches—e.g., as two objects cross paths, the tracking may mistake each actor for the other. Additionally, extracting and caching DNN features for each detected object is computationally expensive, and thus does not scale well to tracking a large number of objects.

SUMMARY

Embodiments of the present disclosure relate to object tracking using learned feature vectors for single and multi-sensor applications. Systems and methods are disclosed that leverage outputs from various sensors of a machine to track objects in the view of a single sensor or across multiple sensors using a vector-based feature descriptor. Additionally, systems and methods are disclosed that leverage outputs from various sensors to train an artificial intelligence engine using vector triplets. For example, and in contrast to conventional systems, such as those described above, a DNN may be trained directly for object tracking using pixel-level feature descriptors. As a result, the DNN-based model can track objects within a single sensor—or across multiple sensors at a same time instance—even if the object is only partially observed, occluded, crossing paths, and/or the like. The object tracking data from single-sensor tracking and/or across-sensor tracking may be used by one or more downstream components of the ego-machine—such as a world model manager, a path planner, a control component, a localization component, an obstacle avoidance component, an actuation component, and/or the like—to perform one or more operations for controlling the ego-machine through an environment.

BRIEF DESCRIPTION OF THE DRAWINGS

The present systems and methods for learned feature vectors for single and across sensor object tracking are described in detail below with reference to the attached drawing figures, wherein:

FIGS. 6A-6C depict example feature descriptor maps, in accordance with some embodiments of the present disclosure;

DETAILED DESCRIPTION

Figure 1:
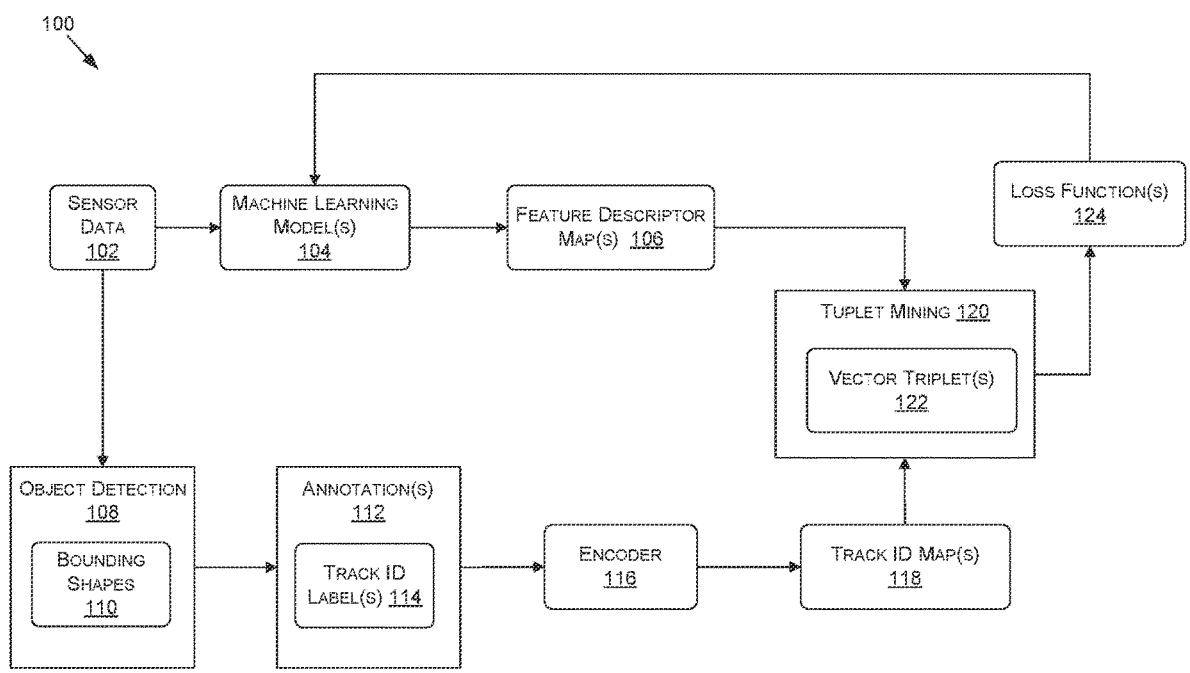
FIG. 1 depicts a data flow diagram illustrating an example training process for training machine learning models to compute feature descriptor maps, in accordance with some embodiments of the present disclosure.

Systems and methods are disclosed related to learned feature vectors for single and across sensor object tracking. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to tracking objects across multiple sensors and/or through time, this is not intended to be limiting, and the systems and methods described herein may be used in augmented reality, virtual reality, mixed reality, robotics, security and surveillance, autonomous or semi-autonomous machine applications, and/or any other technology spaces where tracking objects across multiple sensors and/or through time may be used.

As described herein, and in contrast to conventional approaches of object tracking, the current systems and methods provide techniques to track an object using outputs from sensors (e.g., cameras, RADAR, sensors, LIDAR, etc.) of a machine in real-time or near real-time. In order to accomplish this, the system uses ground truth vector triplets to train the DNN. Generally, training data is provided as input to the DNN, and the DNN uses the training data to generate descriptor maps including one-dimensional (1D) vector feature descriptors at least for pixels associated with objects. The training data may be selected to include a multi-vector triplet, including an anchor vector (e.g., associated with a first pixel known to correspond to an object), a positive vector (e.g., associated with a second pixel known to correspond to the object), and a negative vector (e.g., associated with a third pixel known to correspond to a different object than the object). In this way, when the DNN computes the output feature vectors using the training data, these known anchor, positive, and negative vectors may be used as ground truth to train the DNN to minimize the distance between the positive vector and the anchor vector while maximizing the distance between the anchor vector and the negative vector. In this way, the DNN may be trained to compute similar or identical feature vector descriptors for a same object and different feature vectors for different objects.

In particular, the ground truth vector triplets may be selected using an object detection algorithm that marks objects in an image (or other sensor data representation of the space) with bounding shapes. In some aspects, tracks that are shorter than a predetermined minimum track length are removed. The predetermined minimum track length may vary based on object class (e.g., vehicle or pedestrian). Additionally, in some aspects, the last 30 frames of a data sequence (e.g., video) may be filtered to enhance the accuracy of the ground truth data by eliminating faulty object detection errors. In some aspects, to reduce the training burden, data sequences longer than a predetermined threshold may be sampled every n frames to reduce the data sequence length. Track IDs may then be assigned to each bounding shape—e.g., each pixel within a same bounding shape may be assigned a same track ID value, and background pixels (e.g., pixels that are not covered by any bounding shape) may be assigned values of zero (0). During training, all feature vectors within a particular bounding shape (e.g., marked with the same track ID) are considered positive samples while all feature vectors that belong to other objects are considered negative samples.

Vector triplets may be created from feature descriptor maps across space and/or time. For example, in single-sensor tracking scenarios at least two descriptor maps (descriptor map 1 at $t_{1-k}$ and descriptor map 2 at $t_1$) may be used to create a vector triplet. The positive sample can be one or more vectors from the positive sample (e.g., vectors within a bounding shape with the same track ID) from descriptor map 1, and the negative sample can be one or more vectors from the negative sample (e.g., vectors within another bounding shape) from descriptor map 1. The anchor can be one or more vectors from the positive sample of descriptor map 2.

Similarly, vector triplets can be generated for training the DNN for across sensor tracking—e.g., at a same time step. In such an example, the positive sample can be one or more vectors from the positive sample (e.g., vectors within a bounding shape with the same track ID) from a first sensor descriptor map, and the negative sample can be one or more vectors from the negative sample (e.g., vectors within another bounding shape) from the first sensor descriptor map. The anchor can be one or more vectors from the positive sample of a second sensor descriptor map.

For a given triplet, a triplet loss function may be used to minimize the distance between the anchor feature descriptor and the positive feature descriptor (e.g., the distance "d" between anchor "a" and positive "p"). Said another way, the triplet loss minimizes d (a, p). Similarly, the triplet loss function may minimize the distance between the anchor and the negative (e.g., minimizes d (a, n)). This loss function may thus cause the DNN to learn useful feature descriptors in the embedding space such that features of the same object across space and/or time are closer while features of distinct objects are further away. To prevent the DNN from learning trivial (all zero) feature vectors, a margin value may be added to the maximum margin loss. In addition, the triplet loss may be computed at the pixel-level to cause the DNN to learn useful feature descriptors even in situations where the ground truth data includes objects that are partially obscured.

Advantageously, the use of vector triplets facilitates DNN training using multiple mining options. Generally, there are three types of triplets: easy triplets, hard triplets, and semi-hard triplets. In one or more embodiments, easy triplets have a triplet loss of 0, hard triplets are triplets where the negative sample is closer to the anchor than the positive sample, and semi-hard triplets are triplets where the negative sample is not closer to the anchor than the positive, but still has positive loss. To accelerate training and increase the discerning power of the DNN, only semi-hard and hard triplets may be used during training, in embodiments. However, easy, semi-hard, and hard triplets may be used during training in some aspects. Additionally, using vector triplets facilitates epoch or batch mining. For example, the vectors and bounding shapes for the entire training set can be computed before training the DNN on the epoch long triplets. Alternatively, a batch all or batch hard approach to triplet mining can be implemented. For batch all triplet mining, all the valid triplets are selected for a given batch, the loss on the hard and semi-hard triplets is averaged, and the easy triplets are ignored. For batch hard triplet mining, the hardest positive and the hardest negative among the batch for each anchor are selected and the triplet loss function is computed for the hardest triplet only.

In embodiments, training a DNN to track objects using vector triplets facilitates deployment integration with minimal memory burden. For example, the trained or deployed DNN can be integrated into traditional ego-machine systems with minimal downstream impact by using a pixel-level to bounding shape-level conversion. Illustratively, during deployment, the pixel-level feature descriptors can be converted to bounding shape-level feature descriptors by averaging of all of the pixel-level feature descriptors within a particular bounding shape. The average may then be assigned as the bounding shape-level feature descriptor, and this bounding shape-level feature descriptor may be used across frames (e.g., from a same sensor or across different sensors) to track a corresponding object.

Comparatively straightforward post-processing steps can facilitate single-sensor and multi-sensor object tracking. For applications in single-sensor tracking, the DNN processes consecutive frames (e.g., tx, tx-1, tx-2, tx-3, and so on) separately and generates the bounding shape-level feature descriptors for detected objects as described above. Object association scores may be computed between each bounding shape feature descriptor to, and the differences in feature descriptors may be computed to identify a same object across frames. For example, where the distance between feature descriptors is less than a threshold, the bounding shapes in the different frames may be determined to correspond to a same object. In some aspects, the object association score is the cosine distance between each bounding shape feature descriptor. In embodiments, for tracking purposes, the best match can be found using a KNN algorithm.

With reference to FIG. 1, FIG. 1 is an example data flow illustrating an example process 100 for training a DNN to track objects using outputs from one or more sensors of a machine, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

At a high level, the process 100 may include one or machine learning model(s) 104 receiving one or more inputs, such as sensor data 102, and generating one or more outputs, such as output (e.g., feature descriptor map(s) 106). As used in reference to training, the sensor data 102 may be referred to as training data. Although the sensor data 102 is primarily discussed with respect to image data representative of images, this is not intended to be limiting, and the sensor data 102 may include other types of sensor data used for object detection and/or object tracking, such as LIDAR data, SONAR data, RADAR data, and/or the like—e.g., as generated by one or more sensors of the vehicle 800 as described in reference to FIGS. 8A-8D.

Process 100 may include generating and/or receiving sensor data 102 from one or more sensors. The sensor data 102 may be received, as a non-limiting example, from one or more sensors of a machine (e.g., vehicle 800 of FIGS. 8A-8D). The sensor data 102 may be used by the ego-machine 800, and within the process 100, to track objects across frames and/or across sensors. The sensor data 102 may include, without limitation, sensor data 102 from any of the sensors of the vehicle including, for example and with reference to FIGS. 8A-8C, global navigation satellite systems (GNSS) sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 876, stereo camera(s) 868, wide-view camera(s) 870 (e.g., fisheye cameras), infrared camera(s) 872, surround camera(s) 874 (e.g., 360 degree cameras), long-range and/or mid-range camera(s) 878, speed sensor(s) 844 (e.g., for measuring the speed of the vehicle 800), and/or other sensor types. As another example, the sensor data 102 may include virtual sensor data generated from any number of sensors of a virtual vehicle or other virtual object. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment. As such, by using the virtual sensor data, the machine learning model(s) 104 described herein may be tested, trained, and/or validated using simulated data in a simulated environment, which may allow for testing more extreme scenarios outside of a real-world environment where such tests may be less safe.

In some embodiments, the sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 used for training may include original images (e.g., as captured by one or more image sensors), down-sampled images, up-sampled images, cropped or region of interest (ROI) images, otherwise augmented images, and/or a combination thereof. The machine learning model(s) 104 may be trained using the images (and/or other sensor data 102) as well as corresponding ground truth data (e.g., track ID map(s) 118). The ground truth data (e.g., track ID map(s) 118) may include annotations, labels, masks, maps, and/or the like. For example, in some embodiments, the ground truth data may include track maps. An encoder 116 may use the object detection 108 and annotations to encode the ground truth data (e.g., track ID map(s) 120). In some embodiments, the object detection 108 may include bounding shape(s) 110 and track ID label(s) 114.

With reference to the object detection 108 and annotations 112, the object detection 108 and annotations 112 may be generated within a drawing program (e.g., an annotation program), a computer aided design (CAD) program, a labeling program, another type of program suitable for generating the annotations 112 and/or other of the ground truth data (e.g., track ID map(s) 118), and/or may be hand drawn, in some examples. In any example, the object detection 108, annotations 112, and/or the ground truth data (e.g., track ID map(s) 118) may be synthetically produced (e.g., generated from computer models or renderings), real produced (e.g., designed and produced from real-world data), machine-automated (e.g., using object detection and tracking to extract features from data and then generate labels), human annotated (e.g., labeler, or annotation expert, defines the location of the labels), and/or a combination thereof. Object detection 108 may include labeling objects with bounding shape(s) 110 corresponding to objects of interest in the sensor data 102. In some examples, the bounding shapes may be defined by a set of line segments that surround the pixels that correspond to an object in the sensor data 102. The line segments may be straight and or curved. The track ID label(s) 114 may be a value that facilitates identification between any labeled item and any other labeled item. For example, a track ID label 114 may be generated for each object, bounding shape, and/or pixel within a bounding shape included in the sensor data. In some embodiments, the track ID label for a particular object is assigned to the bounding shape that corresponds to the object. Similarly, the track ID label for a particular bounding shape may be assigned to each pixel within the bounding shape, in some embodiments. Additionally, a default or null track ID label may define areas of the sensor data that is not associated with an object. For example, background features in the sensor data may be labeled with a track ID label of zero (0).

Figure 2A:
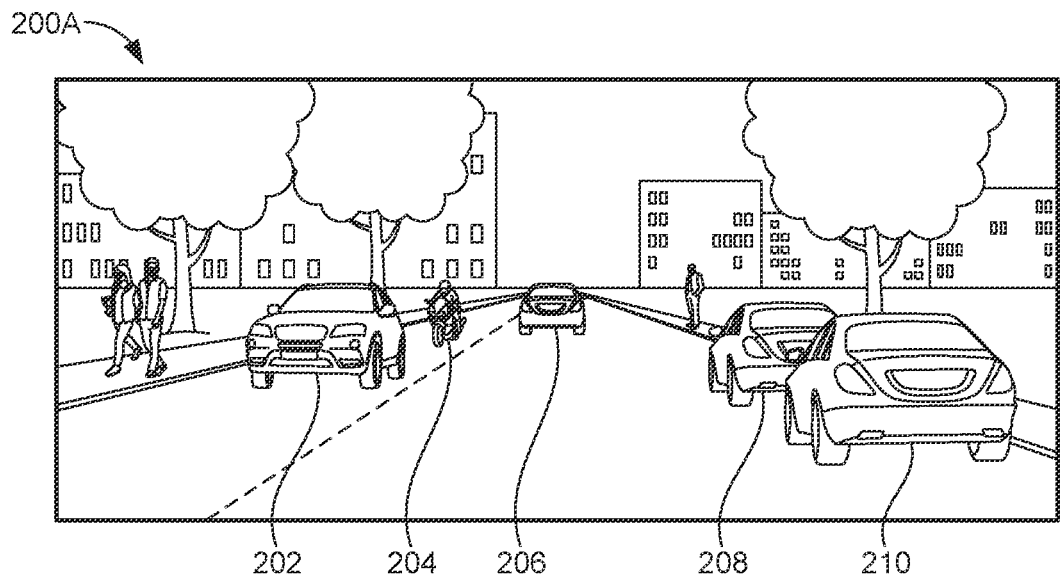
FIG. 2A depicts an example visualization of an instance of sensor data, in accordance with some embodiments of the present disclosure.
Figure 2B:
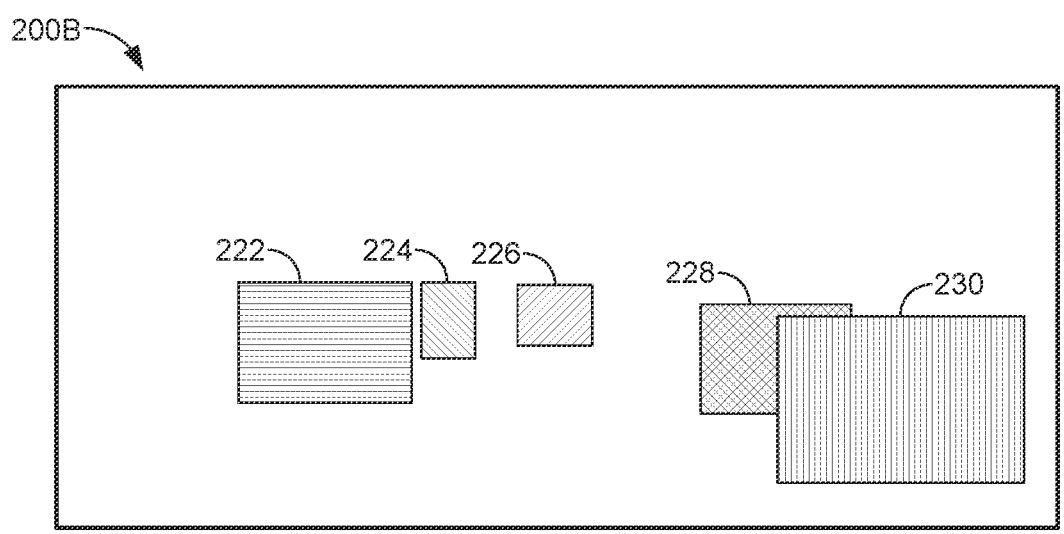
FIG. 2B depicts an example visualization of annotations used to generate ground truth data corresponding to an instance of sensor data, in accordance with some embodiments of the present disclosure.

Now referring to FIGS. 2A-2D, FIGS. 2A-2D illustrate example annotations applied to sensor data for use in ground truth generation for training a machine learning model to track objects, in accordance with some embodiments of the present disclosure. For example, FIG. 2A illustrates an image 200A that may be used to generate ground truth data in accordance with the training process 100 of FIG. 1. FIG. 2B illustrates an example of annotations applied to sensor data to train a machine learning model to track objects. Although images 200A and 200B are depicted as distinct images, this distinction is provided to facilitate the description of particularly relevant features. In other words, the annotations (e.g., bounding shapes) depicted in image 200B may be included in image 200A, in some aspects.

Objects in an image (e.g., objects 202, 204, 206, 208, and 210) may be annotated with bounding shapes (e.g., bounding shapes 222, 224, 226, 228, and 230 of FIG. 2B) and track ID labels (e.g., track ID label 232, 234, 236, 238, and 240). For example, the object 202 may be bound by a bounding shape 222 and labeled with track ID 232. Similarly, object 204 may annotated with a bounding shape 224 and labeled with track ID 234, object 206 may annotated with a bounding shape 226 and labeled with track ID 236, object 208 may annotated with a bounding shape 228 and labeled with track ID 236, object 208 may annotated with a bounding shape 228 and labeled with track ID 238, and object 210 may annotated with a bounding shape 230 and labeled with track ID 240. Additionally, in some aspects, the bounding shapes, objects, and/or pixels may be annotated with object classifications (e.g., vehicle, pedestrian, cyclist, etc.).

Referring again to FIG. 1, the encoder 116 may be configured to encode the ground truth information corresponding to the track of an object through time and/or space using the annotation(s) 110. For example, as described herein, a set of sensor data can be annotated with annotations 112. Once annotated, the set of data may be encoded by the encoder to generate the ground truth data (e.g., track ID map(s) 118), which may include track ID map(s) 118. In addition, because the spatial resolution of the sensor data 102 being applied to the machine learning model(s) 104 may be different—e.g., greater than, less than, etc. —the output spatial resolution corresponding to predictions of the machine learning model(s) 104, the ground truth information may be encoded into various formats. For example, objects identified during annotation may be tracked through a data sequence (e.g., a set of sensor data) to determine an object track length (e.g., the number of frames) for an annotated object. Based on the object track, a data sequence may be filtered during encoding. For example, object tracks that are shorter than a predetermined minimum track length are removed during encoding. The predetermined minimum track length may vary based on object class (e.g., vehicle or pedestrian).

Additionally filtering and/or sampling of the sensor data 102 may occur during encoding. For example, the last 30 frames of a data sequence (e.g., video) may be filtered to enhance the accuracy of the ground truth data by eliminating object detection errors. For another example, to reduce the training burden, data sequences longer than a predetermined threshold may be sampled every n frames to reduce the data sequence length.

Figure 2C:
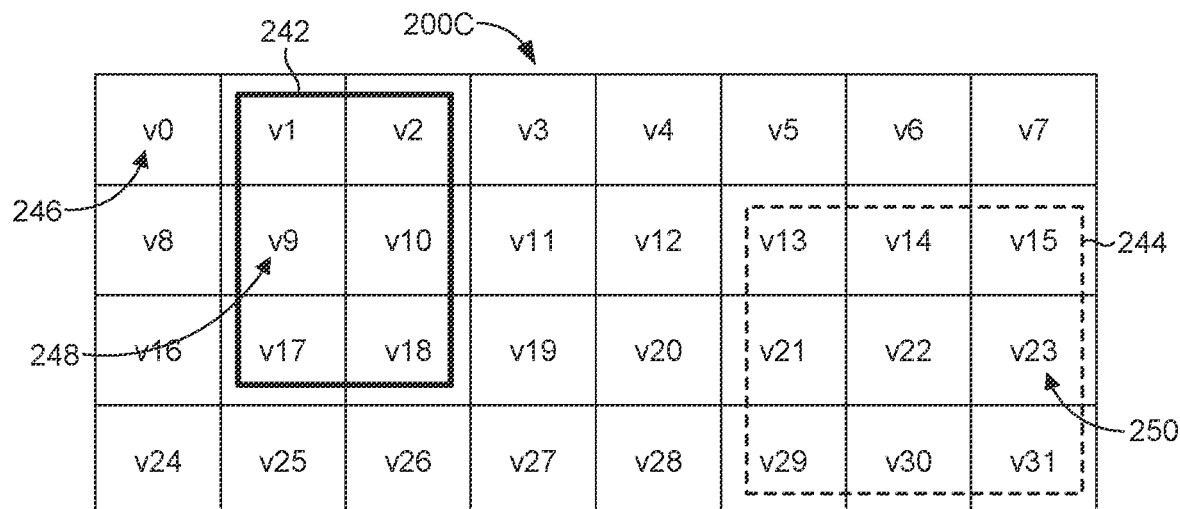
FIGS. 2C-2D depict example feature descriptor vector maps corresponding to training data for a neural network, in accordance with some embodiments of the present disclosure.
Figure 2D:
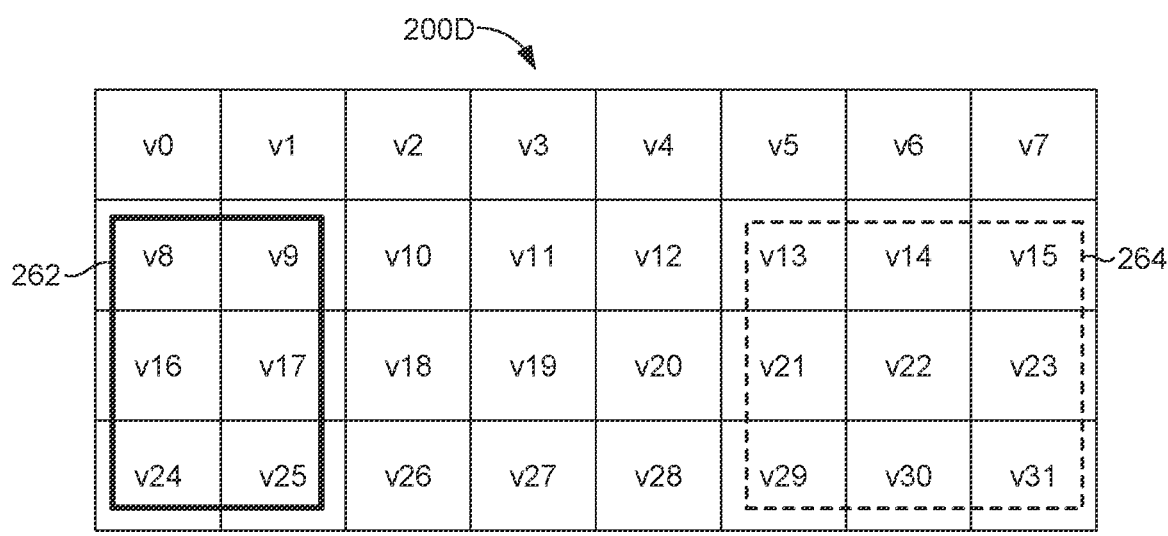

Further, each pixel within the same bounding shape may be encoded with a track ID that corresponds to the track ID of the bounding shape. For example, FIGS. 2C and 2D depict two encoded examples of images that may be used for training a DNN. In some aspects, image 200C and image 200D may depict images captured by the same sensor at different times (e.g., tx, tx-1). In some aspects, image 200C and image 200D may depict images captured by different sensors at the same time (e.g., sensor 1 and sensor 2).

FIG. 2C depicts a first encoded image 200C with detected objects bounded by bounding shapes 242 and 244. As described above, bounding shapes 242 and 244 may each have a track ID annotation. During encoding, each pixel (e.g., v1, v2, v9, v10, v17, v18) within bounding shape 242 may be encoded with the track ID associated with the bounding shape 242. For example, pixel 248 may be encoded with the same track ID as bounding shape 242. Similarly, each pixel within bounding shape 244 may be encoded with the track ID associated with bounding shape 244. For example, pixel 250 may be encoded with the same track ID as bounding shape 244. In some aspects, background pixels (e.g., pixels that are not covered by a bound shape such as pixels 246) may be assigned a common track ID (e.g., a track ID value of zero (0)).

FIG. 2D depicts a second encoded image 200D with detected objects bounded by bounding shapes 262 and 264. During encoding, each pixel (e.g., v8, v9, v16, v17, v24, v25) within bounding shape 262 may be encoded with the track ID associated with the bounding shape 262. As mentioned above, in some aspects, bounding shape 242 and bounding shape 262 may bound the same object in images captured at different times. In some aspects, bound shape 242 and bound shape 262 may bound the same object captured by different sensors at the same time. As such, the track ID encoded for the pixels within bounding shape 242 and within bound shape 262 may be the same track ID.

Returning to FIG. 1, once the ground truth data (e.g., track ID map(s) 118) is generated for each instance of the sensor data 102 (e.g., for each image where sensor data 102 includes image data). For example, encoder 116 may encode a plurality of annotated images (e.g., image 200C and image 200D) to generate a track ID map 118. The track ID map may thus include a series of discrete representations of sensor data. In some embodiments, the series may include discrete representations of the sensor data through time and/or discrete representations of the sensor data across multiple sensors. Additionally, the track ID map(s) include ground truth object identification (e.g., via track ID values) through the discrete representations of the sensor data. The machine learning model(s) 104 may be trained using the ground truth data (e.g., track ID map(s) 118). For example, the machine learning model(s) 104 may generate feature descriptor map(s) 106, and the output may be compared to the ground truth data corresponding to the respective instances of the sensor data 102. For example, the machine learning model(s) 104 may generate the output feature descriptor maps 106 (which may include feature vectors corresponding to each pixel at the output resolution), and the feature vectors from the feature descriptor maps 106 may be compared using the track IDs corresponding to those same pixels from the track ID maps 118. As such, where a feature vector corresponding to two pixels are different, but the two pixels are known to correspond to the same object based on the track IDs, the loss function(s) 126 may penalize this output to cause the machine learning model(s) 104 to learn to compute more similar (e.g., the same) feature vectors for pixels that correspond to a same object. Similarly, with respect to pixels that correspond to different objects, if the feature vectors are similar, but the ground truth data (e.g., track ID map(s) 118) indicates that the pixels correspond to different objects, the machine learning model(s) 104 may be penalized. As such, feedback from the loss function(s) 126 may be used to update parameters (e.g., weights and biases) of the machine learning model(s) 104 in view of the ground truth data (e.g., track ID map(s) 118) until the machine learning model(s) 104 converges to an acceptable or desirable accuracy. Using this process, the machine learning model(s) 104 may be trained to accurately predict the output (e.g., feature descriptor map(s) 106) from the sensor data 102 using the loss function(s) 126 and the ground truth data (e.g., track ID map(s) 118).

The machine learning model(s) 104 may use the sensor data 102 to compute the output (e.g., feature descriptor map(s) 106), which may ultimately be applied to a decoder or one or more other post-processing components (described in more detail herein at least with respect to FIG. 5) to generate object tracking information. Although examples are described herein with respect to using deep neural networks (DNNs), and specifically convolutional neural networks (CNNs), as the machine learning model(s) 104 (e.g., with respect to FIGS. 1 and 5), this is not intended to be limiting. For example, and without limitation, the machine learning model(s) 104 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), computer vision algorithms, and/or other types of machine learning models.

As an example, such as where the machine learning model(s) 104 include a CNN, the machine learning model(s) 104 may include any number of layers. One or more of the layers may include an input layer. The input layer may hold values associated with the sensor data 102 (e.g., before or after post-processing). For example, when the sensor data 102 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the machine learning model(s) 104, and some or all of the convolutional streams may include a respective fully connected layer(s).

In some non-limiting embodiments, the machine learning model(s) 104 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the machine learning model(s) 104, this is not intended to be limiting. For example, additional or alternative layers may be used in the machine learning model(s) 104, such as normalization layers, SoftMax layers, and/or other layer types.

In embodiments where the machine learning model(s) 104 includes a CNN, different orders and numbers of the layers of the CNN may be used depending on the embodiment. In other words, the order and number of layers of the machine learning model(s) 104 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the machine learning model(s) 104 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Process 100 includes tuplet mining 120. Tuplet mining 120 may include generating vector triplet(s) 122 from the training data. Vector triplet(s) 122 may be mined from feature descriptor maps (e.g., feature descriptor map(s) 106 and/or track ID map(s) 118) across space and/or time. For example, in single-sensor tracking scenarios at least two descriptor maps (e.g., where feature descriptor maps are generated from sensor data captured by a single sensor descriptor map 200C may represent $t_{1-k}$ and descriptor map 200D at may represent $t_1$) may be used to create a vector triplet. A vector triplet may include a positive sample, a negative sample, and an anchor. The positive sample may be one or more vectors from the positive sample (e.g., a vector within a bounding shape with the same track ID) from descriptor map 200C, and the negative sample can be one or more vectors from the negative sample (e.g., vectors within another bounding shape) from descriptor map 200C. The anchor can be one or more vectors from the positive sample of descriptor map 200D.

For another example, vector triplets can be generated for training the DNN for across sensor tracking—e.g., at a same time step. In such an example, (e.g., where feature descriptor maps 200C and 200D are generated by different sensors) the positive sample can be one or more vectors from the positive object (e.g., vectors within a bounding shape 242) from a first sensor's descriptor map 200C, and the negative sample can be one or more vectors from the negative sample (e.g., vectors within bounding shape 244) from the first sensor descriptor map 200C. The anchor can be one or more vectors from the bound shape 262 of a second sensor descriptor map 200D.

Said another way, in some aspects a vector triplet may include a pixel-level vector-based feature descriptor identified by a machine learning model for an positive object at least two time points and/or from two sensors (e.g., the positive sample and the anchor). The vector triplet may also include a pixel-level vector-based feature descriptor identified by the machine learning model for a negative object at least one time point and/or from one sensor (e.g., the negative sample).

A vector triplet may be mined or generated in number of ways. For example, and returning to FIG. 1, sensor data 102 may be provided as input to the machine learning model(s) 104. The machine learning model(s) 104 may output feature descriptor map(s) 106. In a case where the sensor data is an image or series of images, the feature descriptor map(s) 106 may include one-dimensional (1D) vectors generated for each pixel in an image (at the output resolution of the machine learning model(s) 104). In addition, because the spatial resolution of the sensor data 102 being applied to the machine learning model(s) 104 may be different—e.g., greater than, less than, etc.—the output spatial resolution corresponding to predictions of the machine learning model(s) 104, a feature descriptor map may be encoded in various formats. In some aspects, each vector (e.g., $v_n$) associated with a pixel within a bounding shape in a corresponding track ID map associated with a first object (e.g., object 202) are assigned as positive vectors. In some aspects, each vector associated with a pixel within a bounding shape in a corresponding track ID map associated with a second object are assigned as a negative vectors. Additionally, in some aspects, each vector associated with a pixel within a bounding shape in a second corresponding track ID map associated with the first object are assigned as anchor vectors.

Vector triplets may be created from feature descriptor maps across space and/or time. For example, the positive vectors (p), negative vectors (n), and anchor vectors (a) may be combined to form a set of vector triplets. For a given triplet, a triplet loss function may be used to minimize the distance between the anchor feature descriptor and the positive feature descriptor (e.g., the distance "d" between anchor "a" and positive "p"). Said another way, the triplet loss minimizes d (a, p). Similarly, the triplet loss function may minimize the distance between the anchor and the negative (e.g., minimizes d (a, n)). In some embodiments, a margin value may be added to the maximum margin loss. For example, in a pseudo function expression, the loss function 124 may include the loss function of formula (1), below:

$$\mathcal{L} = \max(d(a,p) - d(a,n) + \text{margin}, 0) \quad (1)$$

As such, feedback from the loss function(s) 126 may be used to update parameters (e.g., weights and biases) of the machine learning model(s) 104 in view of the ground truth data (e.g., track ID map(s) 118) until the machine learning model(s) 104 converges to an acceptable or desirable accuracy. Using the process 100, the machine learning model(s) 104 may be trained to accurately predict the output (e.g., feature descriptor map(s) 106) (and/or associated classifications) from the sensor data 102 using the loss function(s) 124, the vector triplet(s) 122, and the ground truth data (e.g., track ID map(s) 118).

As mentioned above, there are generally three types of triplets: easy triplets, hard triplets, and semi-hard triplets.

Easy triplets have a triplet loss of zero (0), hard triplets are triplets where the negative sample is closer to the anchor than the positive sample, and semi-hard triplets are triplets where the negative sample is not closer to the anchor than the positive, but still has positive loss. In some embodiments, semi-hard and hard triplets may be used during training as feedback from the loss function(s) 126 to update parameters of the machine learning model(s) 104. In some embodiments, easy, semi-hard, and hard triplets may be used during training in some aspects.

Additionally, vector triplets may be mined using epoch or batch mining. For example, for epoch mining vector triplet(s) 122 may be generated for each feature descriptor map(s) 106 based on the track ID map(s) 120 for an epoch. The feedback from the loss function for each triplets for the epoch may be used to update parameters. For another example, for batch mining vector triplet(s) 122 a subset of an epoch may be batched and the feedback from the loss function(s) 124 for each triplet of the batch may be used to update the parameters of the machine learning model(s) 104. Another subset of the epoch may be batched and the feedback generated using the updated parameters of the machine learning model(s) 104. The vector triplet(s) 122 from the second subset and the feedback from the loss function(s) 124 for each triplet of the batch may be used to update the parameters of the machine learning model(s) 104. This batch mining approach may be used in a batch all or batch hard context.

Figure 3A:
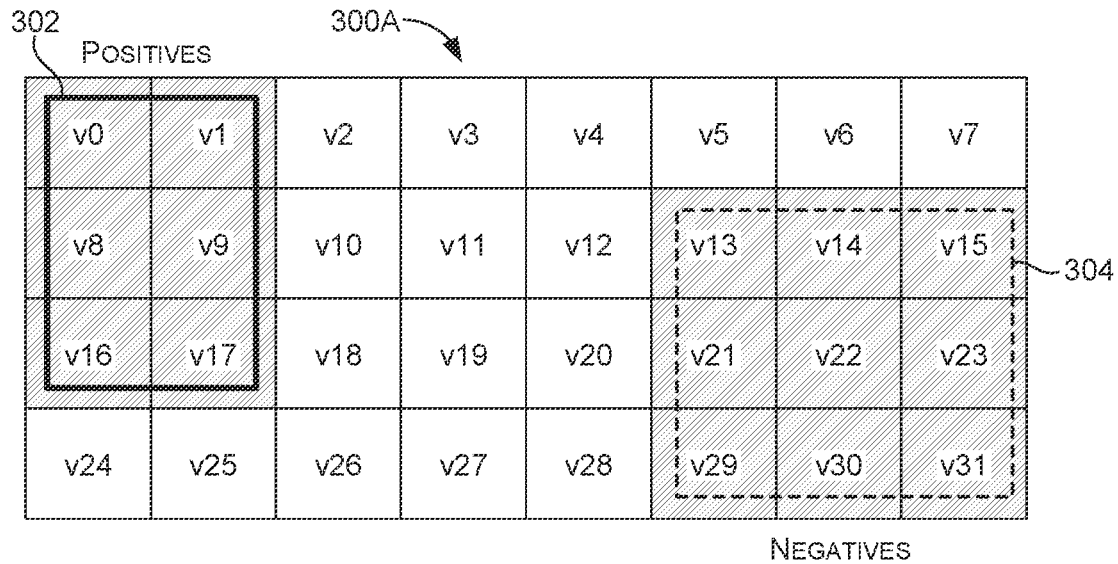
FIGS. 3A-3B depict example positive, negative, and anchor samples from feature descriptor vector maps, in accordance with some embodiments of the present disclosure.
Figure 3B:
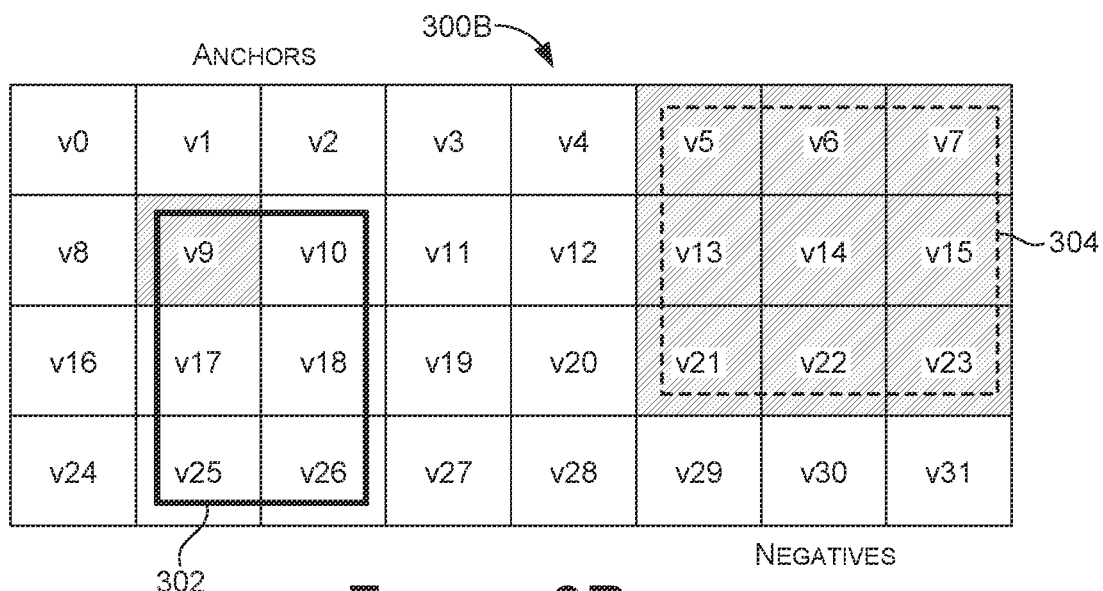

For example, and turning briefly to FIG. 3A and with continued reference to FIG. 1, an example feature descriptor map 300A is depicted in accordance with some aspects described herein. Feature descriptor map 300A includes positive vectors (e.g., v0, v1, v8, v9, v16, and v17) and negative vectors (e.g., v13, v14, v15, v21, v22, v23, v29, v30, v31). Feature descriptor map 300A also includes a first bounding shape 302 and a second bound shape 304. Turning briefly to FIG. 3B, and with continued reference to FIG. 1, an example feature descriptor map 300B is depicted in accordance with some aspects described herein. Feature descriptor map 300B includes positive vectors (e.g., v9, v10, v17, v18, v25, and v26) and negative vectors (e.g., v5, v6, v7, v13, v14, v15, v21, v22, and v23). In particular, feature descriptor map 300B includes positive vectors generated from the same object at a different time and/or detected by a different sensor as the positive vectors from feature descriptor map 300A. Accordingly, for vector triplet mining, feature descriptor map 300B may be said to include anchor vectors (e.g., v9, v10, v17, v18, v25, and v26).

In batch all triplet mining all the valid triplets are selected for a given batch. For example, a valid triplet with an anchor v9 from feature descriptor map 300B includes any positive vector (e.g., v0, v1, v8, v9, v16, and v17) from feature descriptor map 300A, and any negative vector from either feature descriptor map 300A or 300B. In some embodiments, the loss is determined for each valid triplet mined. The hard and semi-hard triplets may be averaged in some embodiments, and the easy triplets are ignored. In batch hard triplet mining the hardest positive and the hardest negative among the batch for each anchor are selected and the triplet loss function is computed for the hardest triplet only.

Additionally, one skilled in the art will understand that the bounding shapes and pixels depicted in FIGS. 2C, 2D, 3A, 3B, 6A, and 6B are illustrative. As depicted, the pixels are not enclosed by the bounding shapes. In other words, it is recognized that a portion of the pixels extends beyond the bounding shapes depicted in FIGS. 2C, 2D, 3A, 3B, 6A, and 6B. However, this is not intended to introduce a conflicting interpretation of the figures and the corresponding descriptions. Rather, the depiction of the bounding shapes and pixel boundaries are intended to clearly distinguish each feature while conveying information within the constraints of the figures.

Figure 4A:
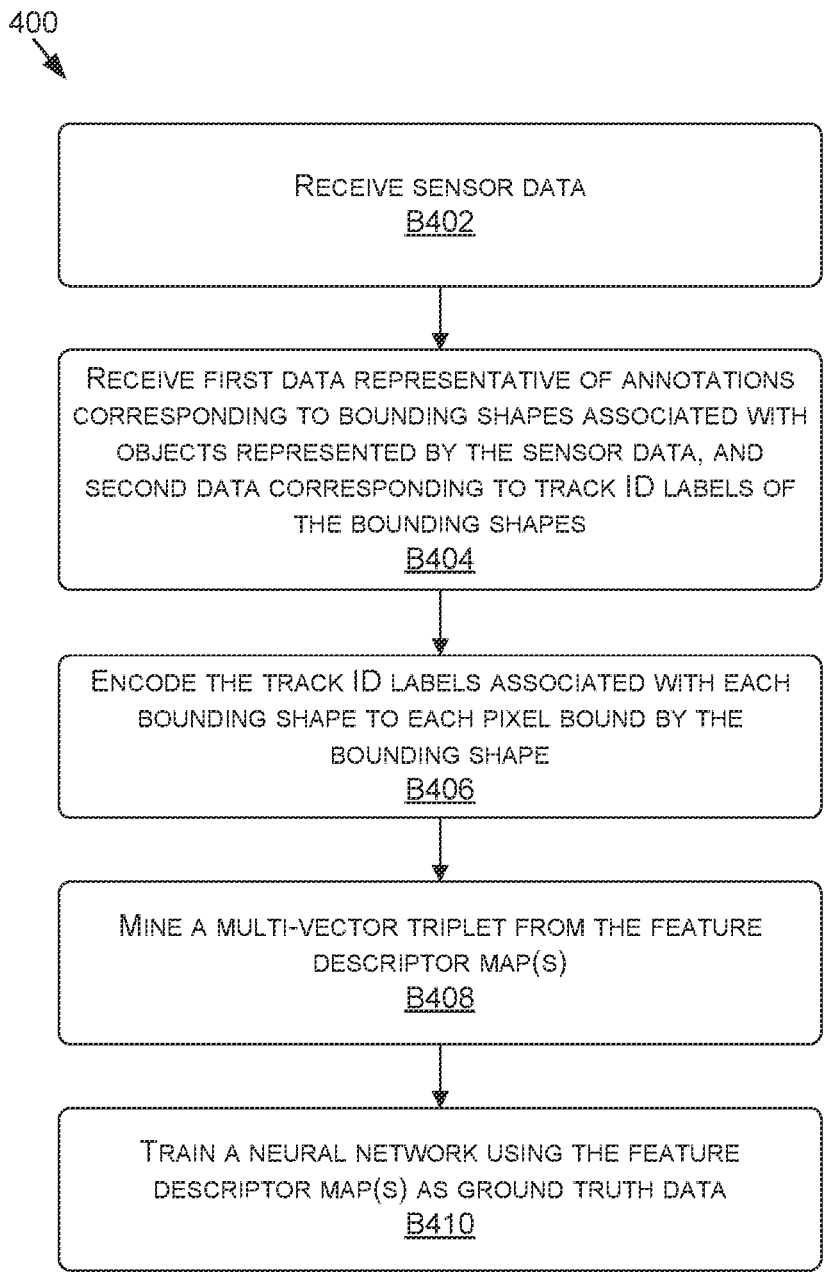
FIG. 4A-4B depict flow diagrams of example methods for training a machine learning model to track an object, in accordance with some embodiments of the present disclosure.
Figure 4B:
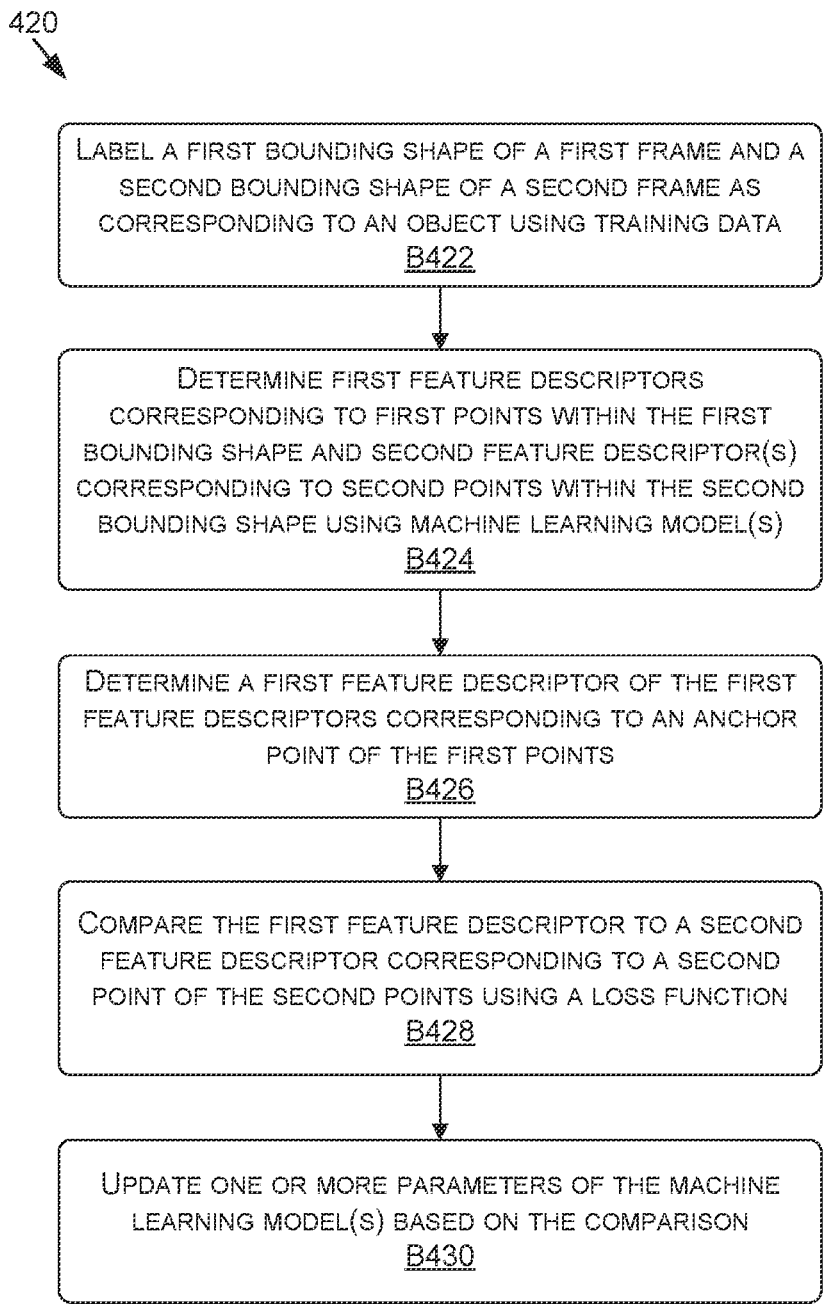

Now referring to FIGS. 4A and 4B, each block of method 400 and method 420, described herein, comprises a computing process that may be performed using any combination of hardware, firmware, and/or software. For instance, various functions may be carried out by a processor executing instructions stored in memory. The methods 400 and 420 may also be embodied as computer-usable instructions stored on computer storage media. The methods 400 and 420 may be provided by a standalone application, a service or hosted service (standalone or in combination with another hosted service), or a plug-in to another product, to name a few. In addition, method 400 and method 420 are described, by way of example, with respect to the process 100 of FIG. 1. However, method 400 and method 420 may additionally or alternatively be executed by any one system, or any combination of systems, including, but not limited to, those described herein.

FIG. 4A is an example flow diagram showing a method 400 for training a neural network to track an object, in accordance with some embodiments of the present disclosure. The method 400, at block B402, includes receiving sensor data. For example, the sensor data 102 may be generated and/or received where the sensor data 102 includes image data representing images depicting the location of objects at different times and/or from different sensors.

The method 400, at block B404, includes receiving first data representative of annotations corresponding to bounding shapes associated with objects represented by the sensor data, and second data corresponding to track ID labels of the bounding shapes. For example, data representative of the object detection 110 and annotations 112 may be generated and/or received.

The method 400, at block B406, includes encoding the track ID labels associated with each bounding shape to each pixel bound by the bounding shape. For example, encoder 116 may encode the pixels with track ID label(s) to the track ID map(s) 120 to use as ground truth data (e.g., track ID map(s) 118) to train the machine learning model(s) 104.

The method 400, at block B408, includes mining a multi-vector triplet from the feature descriptor map(s). For example, a vector triplet 122 may be mined based on the track ID map(s) 120 and feature descriptor map(s) 106. A vector triplet may be one of three types: easy triplets, hard triplets, and semi-hard triplets. An easy triplet has a loss of zero (0), hard triplets are triplets The method 400, at block B410, includes training a neural network using the feature descriptor map(s) as ground truth data. For example, the track ID map(s) 120 may be used as ground truth data along with the vector triplet(s) 122 to train the machine learning model(s) to track objects.

FIG. 4B is another example flow diagram showing a method 420 for training a neural network to track an object, in accordance with some embodiments of the present disclosure. The method 420, at block B422, includes labeling, using training data, a first bounding shape of a first frame and a second bounding shape of a second frame as corresponding to an object. For example, object detection 108 may label sensor data 102 with bounding shapes 110.

The method 420, at block B424, includes determining one or more first feature descriptors corresponding to first points within the first bounding shape of the first frame and one or more second feature descriptors corresponding to second points within the second bounding shape of the second frame using a deep neural network. For example, tuplet mining 120 may be used to generate a positive and negative of a vector triplet 122 based on feature descriptor map(s) 106 and corresponding track ID map(s) 118.

The method 420, at block B426, includes determining a first feature descriptor of the one or more first feature descriptors corresponding to an anchor point of the first points. For example, tuplet mining 120 may be used to generate an anchor of a vector triplet 122 based on feature descriptor map(s) 106 and corresponding track ID map(s) 118.

The method 420, at block B428, includes comparing the first feature descriptor to a second feature descriptor corresponding to a second point of the second points using a loss function. For example, loss function 124 may be used to compare the feature descriptors of a vector triplet 122.

The method 420, at block B430, includes updating one or more parameters of the deep neural network based, at least in part, on the comparison. For example, the output of loss function 124 may be used to update one or more parameters of a machine learning model(s) 104

Figure 5:
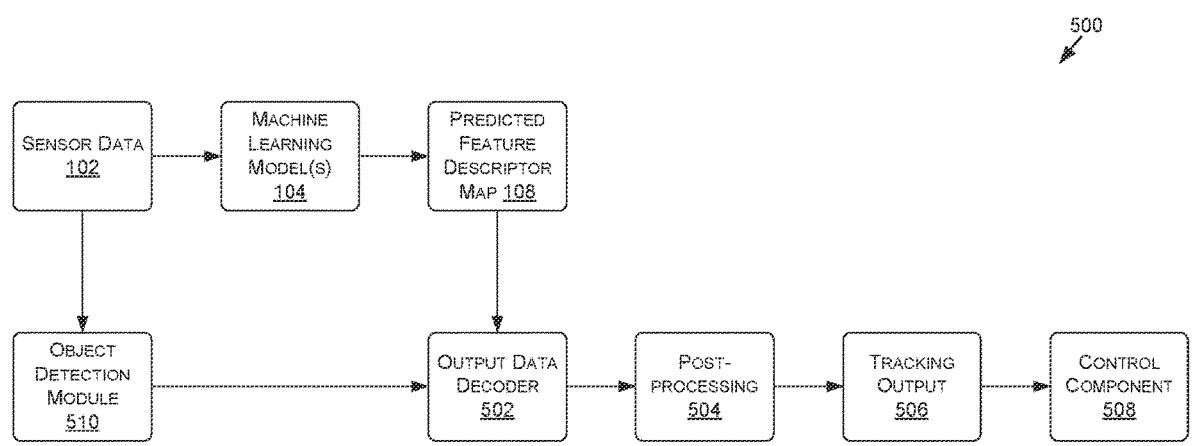
FIG. 5 depicts a data flow diagram illustrating an example process for tracking objects using machine learning models, in accordance with some embodiments of the present disclosure.

Referring now to FIG. 5, FIG. 5 is a data flow diagram illustrating an example process 500 for generating object tracking data using outputs from sensors of a vehicle in real-time or near real-time, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10. While the objects tracked are primarily described with respect to FIG. 5 are vehicles, this is not intended to be limiting, and is used for example purposes only.

The sensor data 102 may be similar to that described herein at least with respect to FIG. 1. During deployment, the sensor data 102 may be applied to the machine learning model(s) 104 that has been trained according to the process 100, for example, to compute a feature descriptor map(s) 106 using training sensor data 102. As such, the machine learning model(s) 104 may output—or regress on—one or more feature descriptor map(s) 106 as described in more detail at least with respect to the feature descriptor map(s) 108 in FIG. 1.

The feature descriptor map(s) 106 may be applied to a decoder 502 to generate decoded output(s) 504. In some examples, the decoder 502 may use one or more post-processing algorithms (e.g., temporal smoothing, curve fitting, filtering, etc.) to compute the decoded output(s) 504. For example, the decoder 502 may use the feature descriptor map(s) 106 to track an object through time and/or across multiple sensors, which may be used, in turn, to generate control commands for an ego machine, e.g., by control component 508. The decoded outputs may include object IDs, pixel-level feature vectors, bounding shape level feature vectors, and/or other information corresponding to a detected object (e.g., bounding shapes corresponding to objects which may be used to generate visualizations of the object across time and/or across sensors for debugging, etc.).

In some embodiments, one or more of the outputs may be generated at a first spatial resolution (e.g., a down-sampled spatial resolution) that is different from a second spatial resolution corresponding to the sensor data 102. As such, the decoder 502 may decode the data from the first spatial resolution of the outputs and project or attribute the data to the second spatial resolution of the sensor data 102 (e.g., using the feature descriptor map(s) 106, as described herein). As a result, the processing speeds of the machine learning model(s) 104 may be increased while simultaneously preserving compute resources for other tasks of the system. In addition, by increasing processing speeds, the run-time of the system may be decreased thereby enabling real-time or near real-time deployment of the process 500 within the system (e.g., the vehicle 800).

Additionally, or alternatively, the outputs may be used to facilitate object tracking with comparatively minimal downstream impact, which may preserve compute resources for other tasks of the system. For example, pixel-level feature descriptors may be converted to bounding shape level feature descriptors during post-processing 504 in some embodiments. Post-processing 504 may include averaging the pixel-level feature descriptors within a particular bounding shape of feature descriptor map(s) 106. The average feature descriptor may then be assigned as the bounding shape level feature descriptor. The bounding shape level feature descriptor may be used across frames (from a same sensor or across different sensors) to track a corresponding object.

For example, with reference to FIG. 6A, for feature descriptor map 600, the pixel-level feature descriptor vectors (e.g., v0, v1, v8, v9, v16, and v17) associated with a first bounding shape (e.g., bounding shape 602, as computed using object detection module 510) can be averaged and the resulting feature descriptor vector may be assigned as the object feature descriptor vector. Similarly, the pixel-level feature descriptor vectors (e.g., v13, v14, v15, v21, v22, v23, v29, v30 and v31) associated with a second bounding shape (e.g., bounding shape 604) can be averaged and the resulting feature descriptor vector may be assigned as the object feature descriptor vector. In embodiments, the bounding shapes corresponding to objects may be computed using the object detection module 510, which may include a computer vision algorithm, a machine learning model, a neural network (e.g., a convolutional neural network), and/or another algorithm type that computes bounding shape locations. In some embodiments, the object detection module 510 may be included within the machine learning model(s) 104—e.g., the machine learning model(s) 104 may compute the predicted feature descriptor map 106 in addition to the locations of bounding shapes.

Additionally, or alternatively, post-processing 504 may generate tracking output 506 to facilitate tracking an object across time and/or sensors. For example, and with reference to FIG. 6B, in some applications of single-sensor tracking through a temporal range the machine learning model(s) 104 may process consecutive frames separately and generate feature descriptor maps (e.g., feature descriptor maps 610, 620, 630, and 640) including the bounding shape-level feature descriptors for detected objects as described above. Object association scores may be generated between each bounding shape-level feature descriptor of the temporal series. For example, object association scores may be generated between each combination of bounding shape-level feature descriptors 612, 614, 622, 624, 632, 634, 642, and 644 using a cosine distance between the vectors. The differences in feature descriptors may be computed and the best matches may be identified as the same object across the temporal series. For example, for tracking purposes, the best match can be found using a K nearest neighbor (KNN) algorithm.

Additionally, or alternatively, the bounding shape-level feature descriptor for each object (e.g., 612, 622, and 632) may be averaged may be assigned for the track of the object through the temporal series, in some embodiments. The bounding shape-level feature descriptors (e.g., 642) of the most recent feature descriptor map (e.g., feature descriptor map 640) may be compared to each averaged feature descriptor of the tracks. The best match between the most recent feature descriptor and the averaged feature descriptor is assigned to the same object track.

Figure 6B:
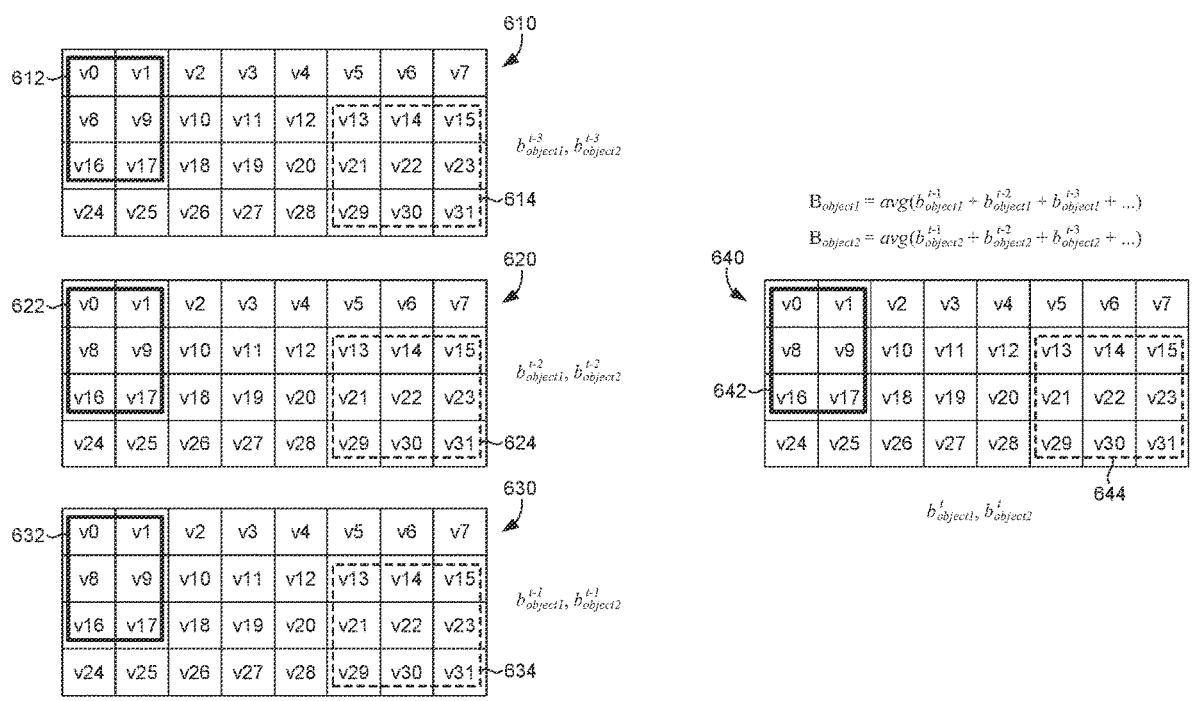
Figure 6C:
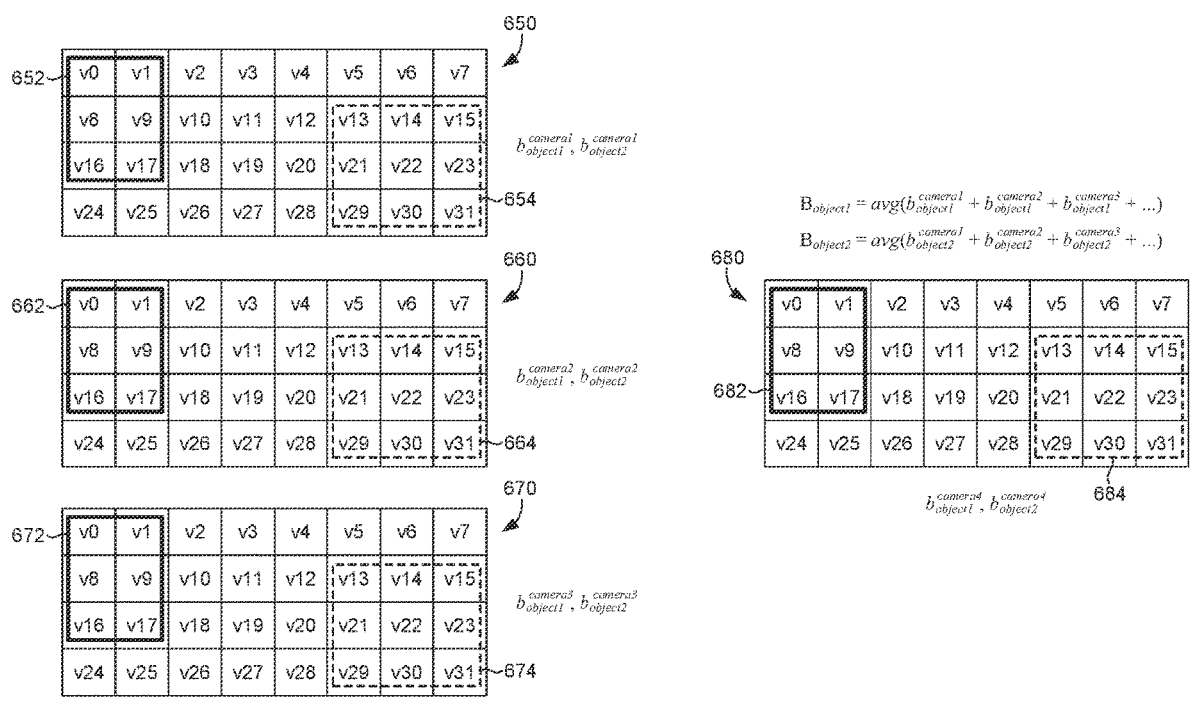

Similarly, with brief reference to FIG. 6C, in in some applications of across sensor tracking the machine learning model(s) 104 may process frames generated by each sensor separately and generate feature descriptor maps (e.g., feature descriptor maps 650, 660, 670, and 680) including the bounding shape-level feature descriptors for detected objects as described above. Object association scores may be generated between each bounding shape-level feature descriptor of the multi-sensor series. For example, object association scores may be generated between each combination of bounding shape-level feature descriptors 652, 654, 662, 664, 672, 674, 682, and 684 using a cosine distance between the vectors. The differences in feature descriptors may be computed and the best matches may be identified as the same object across the temporal series. For example, for tracking purposes, the best match can be found using a K nearest neighbor (KNN) algorithm.

Additionally, or alternatively, the bounding shape-level feature descriptor for each object (e.g., 652, 662, and 672) across the sensors may be averaged and may be assigned for the track of the object, in some embodiments. The bounding shape-level feature descriptors (e.g., 682) of another sensor's feature descriptor map (e.g., feature descriptor map 680) may be compared to each averaged feature descriptor of the tracks. The best match between the most recent feature descriptor and the averaged feature descriptor is assigned to the same object track.

Accordingly, sensor data 102 can be used as input into machine learning model(s). The machine learning model(s) may assign an identity of objects present in the sensor data and us the identity to track the objects across multiple sensors and/or through time. The tracking output 506 may be communicated to a control component 508 of an autonomous machine (e.g., an ego machine). This data may be used by the control component 508 to brake, accelerate, change path with steering input, or any other control operation the autonomous machine is capable of for example.

Figure 7:
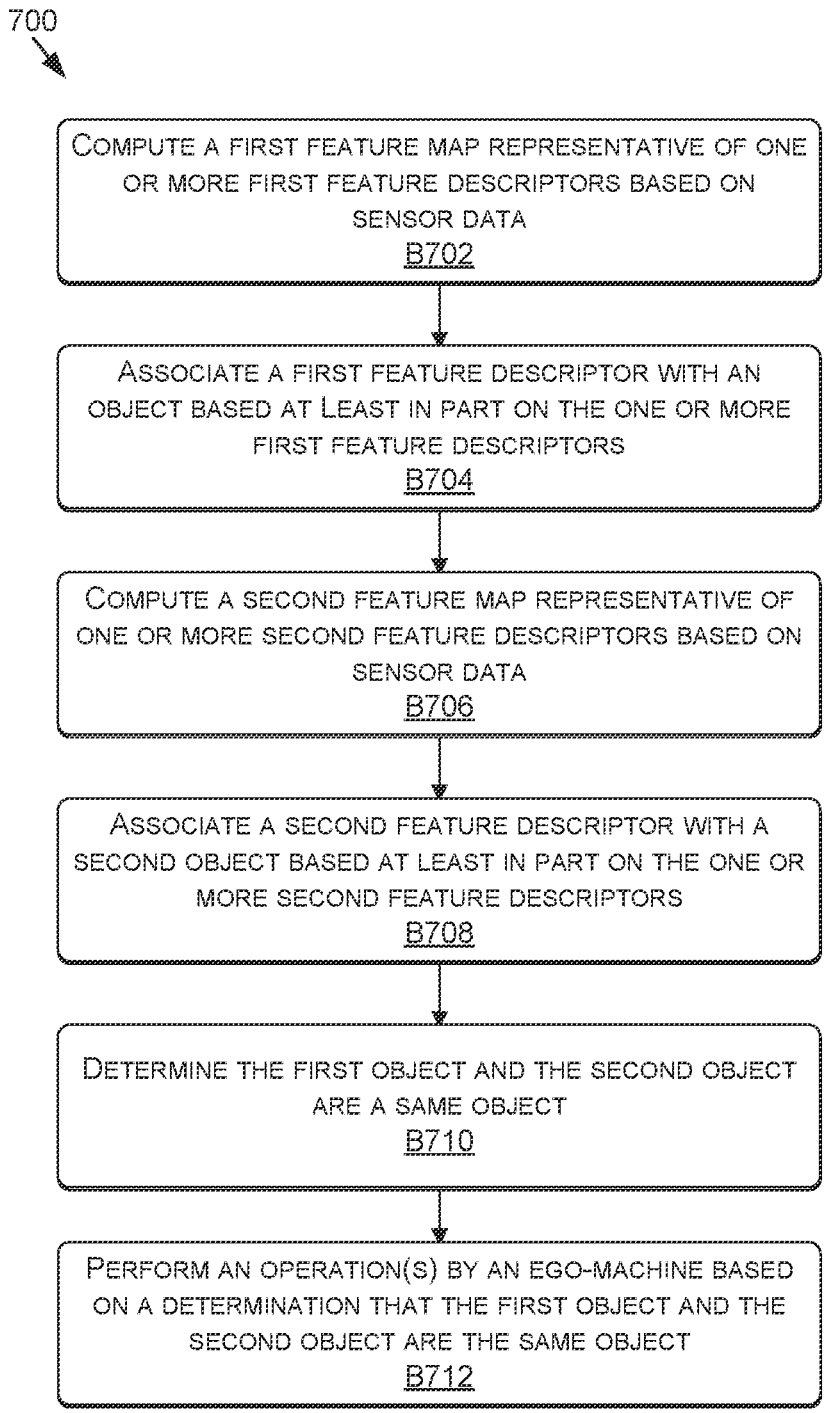
FIG. 7 depicts a flow diagram of an example method for tracking objects using a machine learning model, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, method 700 is described, by way of example, with respect to the process 500 of FIG. 5. However, this method 700 may additionally or alternatively be executed by any one system, or any combination of systems, including, but not limited to, those described herein.

FIG. 7 is a flow diagram showing a method 700 for detecting and tracking an object, in accordance with some embodiments of the present disclosure. Although not depicted, some embodiments of method 700 receiving sensor data and applying the sensor data to a neural network. For example, the sensor data 102 representing an image of objects in a field of view of at least one sensor of vehicle 800 may be applied to the machine learning model(s) 104.

The method 700, at block B702, includes computing, using the neural network and based at least in part on the sensor data of an ego-machine, a first feature map representative of one or more feature descriptors. For example, the machine learning model(s) 104 may compute output(s) including one or more feature descriptor maps 106.

The method 700, at block B704, includes associating a first feature descriptor with a first object based at least in part on the one or more first feature descriptors. For example, the decoder 502 may decode the feature descriptor map(s) 106 to determine bounding shape level feature descriptor vectors for each object detected in the sensor data. The decoder 502 may determine, based on a computed average of pixel-level feature descriptor vectors, a feature descriptor vector for the bounding shape.

The method 700, at block B706, includes computing a second feature map, using the deep neural network and based at least in part on second sensor data generated using one or more sensors of the ego-machine, a second feature map representative of one or more second feature descriptors. For example, the machine learning model(s) 104 may compute output(s) including a second one or more feature descriptor maps 106.

The method 700, at block B708, includes associating a second feature descriptor with a second object based at least in part on the one or more second feature descriptors. For example, the decoder 502 may decode the feature descriptor map(s) 106 to determine bounding shape level feature descriptor vectors for each object detected in the sensor data. The decoder 502 may determine, based on a computed average of pixel-level feature descriptor vectors, a feature descriptor vector for the bounding shape.

The method 700, at B710, includes determining that the first object and the second object are the same object. For example, the decoder 502 may determine, based on a computed object association scores, the best match between bounding shape level feature descriptors. The best matches between the bounding shapes may be identified in tracking output 506 as the same object across sensors and/or time.

The method 700, at block B712, includes performing one or more operations by the vehicle based on the determination that the first object and the second object are the same object. For example, the control component(s) 508 may cause the vehicle 800 to perform one or more operations based on proposed paths determined based on the tracking output 506.

Example Autonomous Vehicle

Figure 8A:
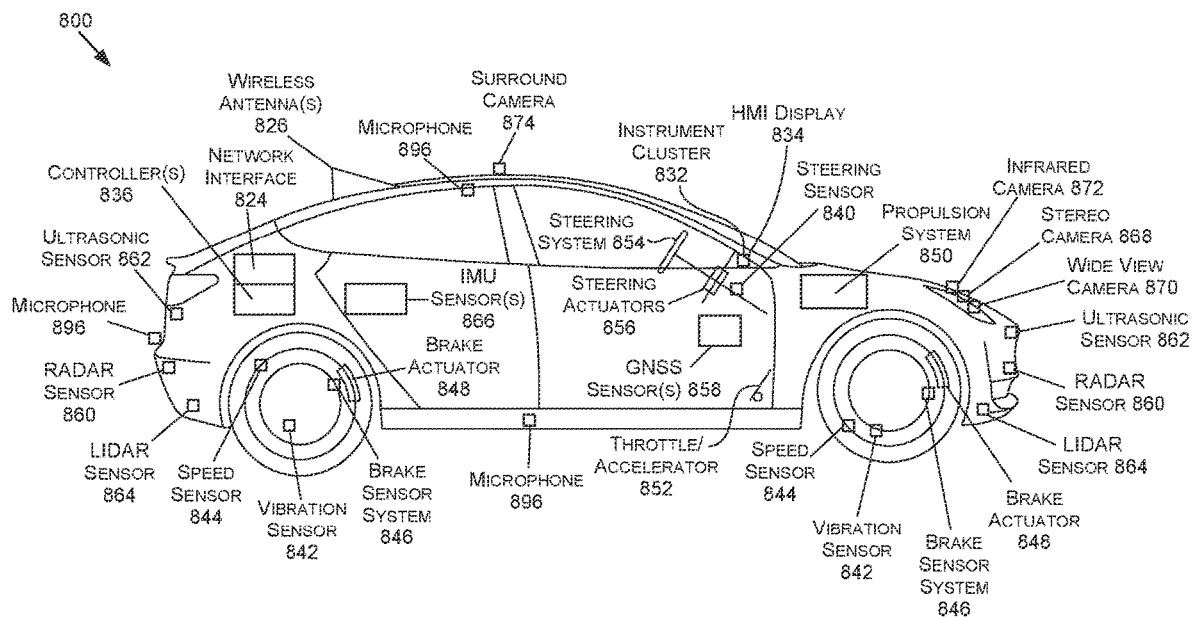
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
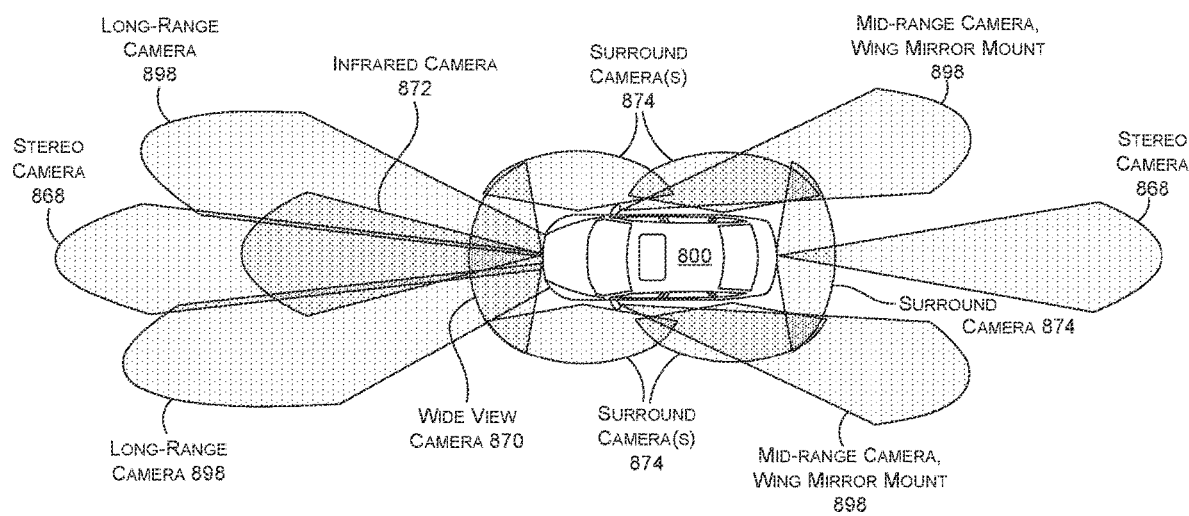
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking. For example, long-range camera(s) 898 may generate sensor data 102.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

As will be understood, long-range camera(s) 898, surround camera(s) 874, stereo camera(s) 868, infrared camera(s) 872, or any other sensor may generate sensor data 102 that can be provided as input to machine learning model(s) (e.g., machine learning model(s) 104 described in relation to FIGS. 1 and 5).

Figure 8C:
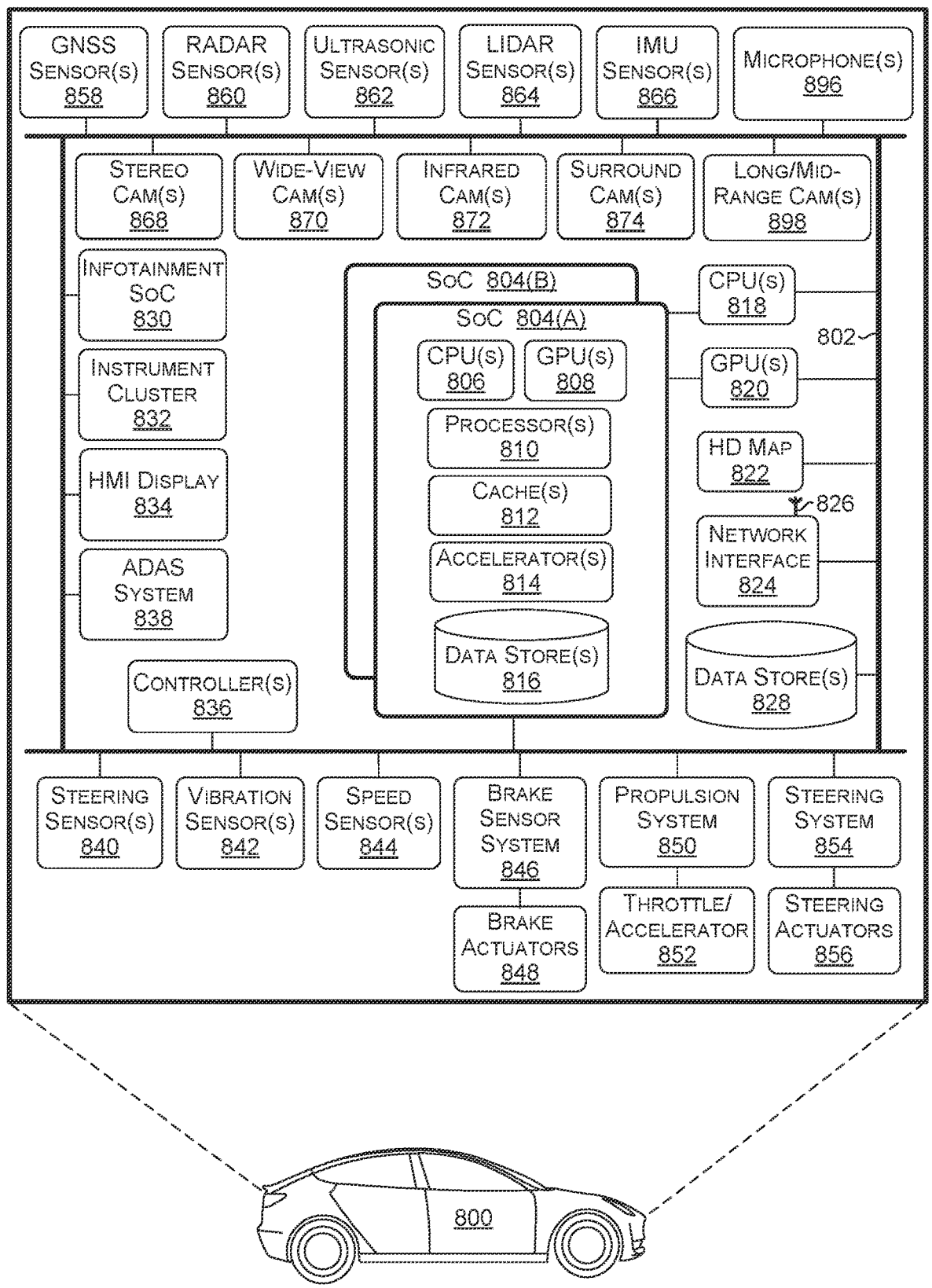
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s)) —or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMM), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane. In some aspects, sensor data 102 may include data generated by RADAR sensor(s) 860.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B. In some aspects, sensor data 102 may include data generated ultrasonic sensor(s) 862.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock. In some aspects, sensor data 102 may include data generated LIDAR sensor(s) 864.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
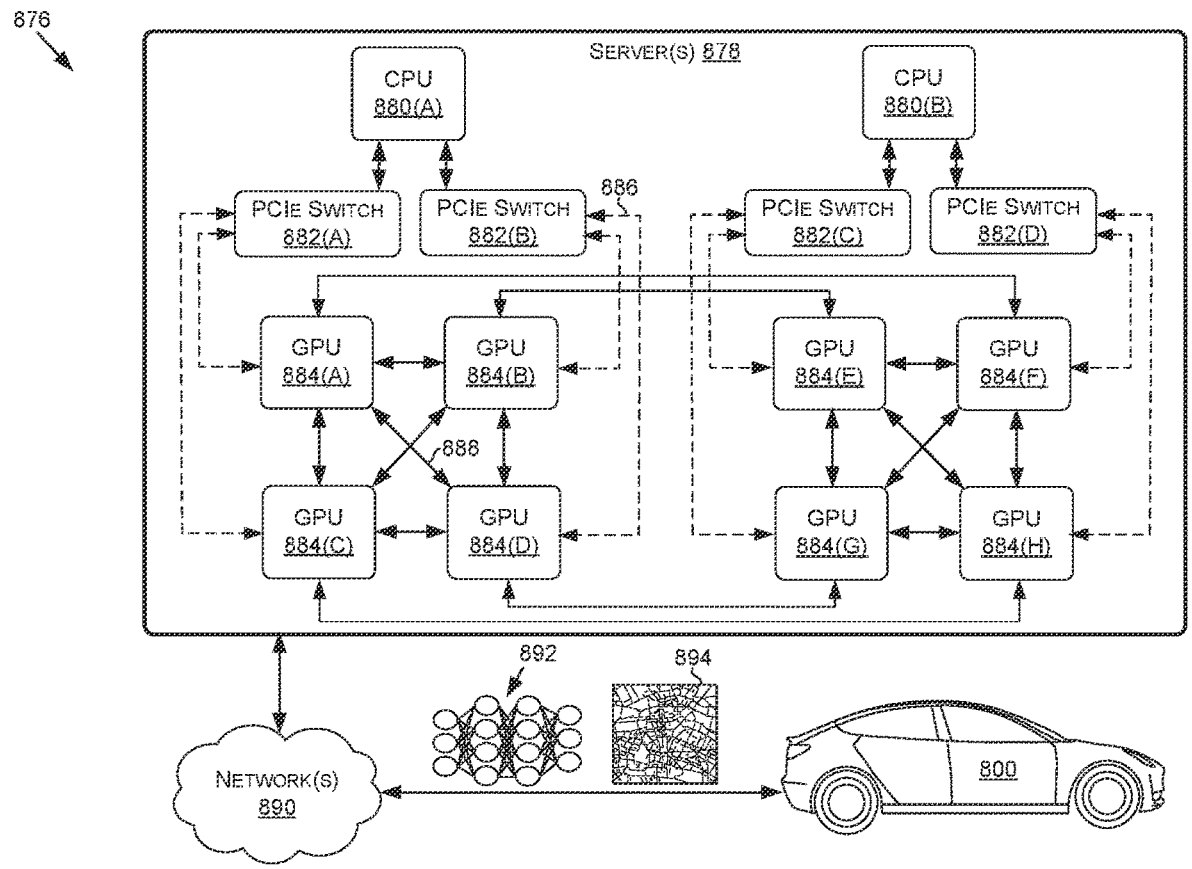
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
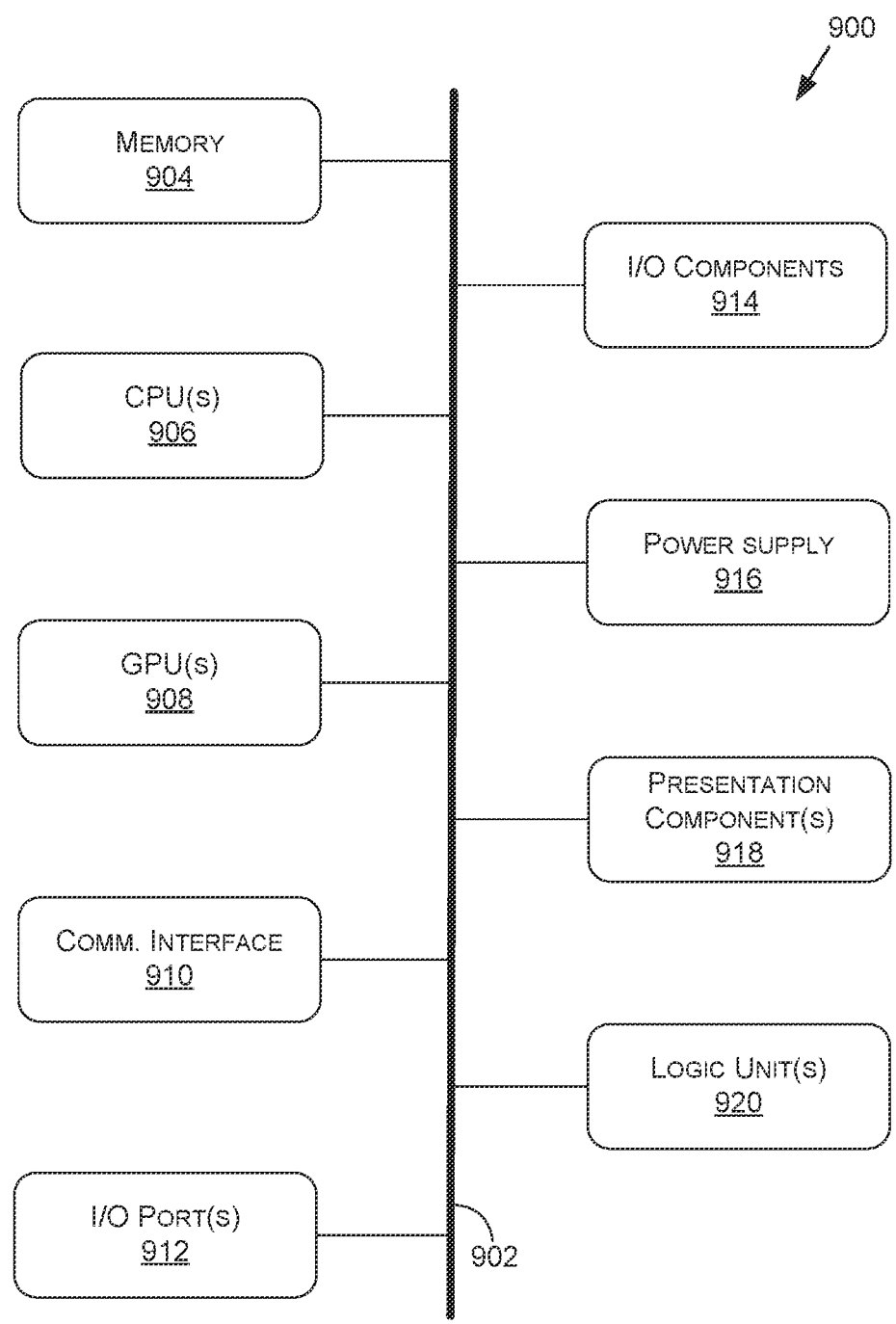
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
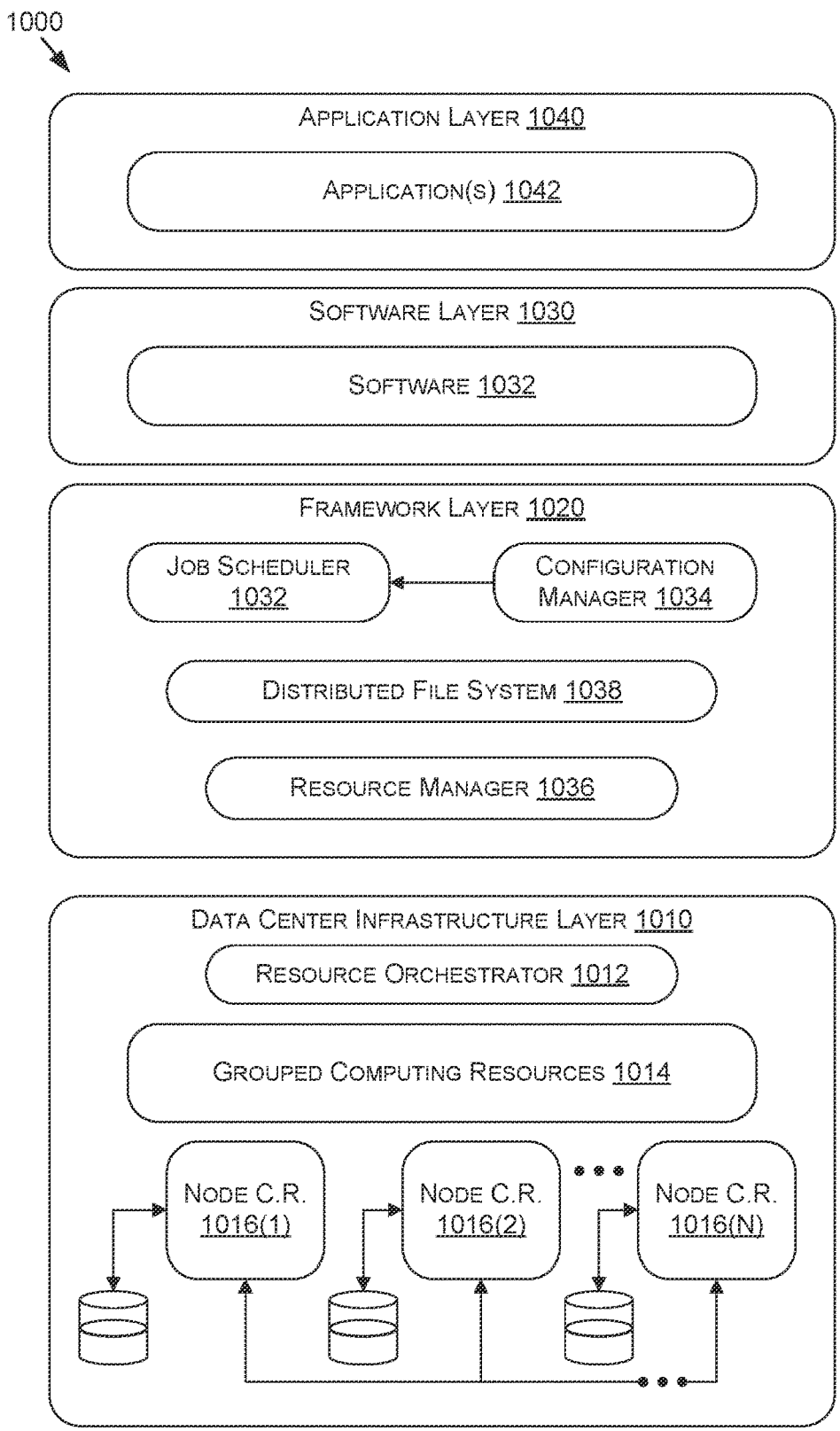
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising: one or more circuits to: compute, using one or more deep neural networks (DNNs) and based at least on first sensor data obtained using one or more first sensors of an ego-machine, a first feature map representative of one or more first feature descriptors; associate a first feature descriptor with a first object based at least on the one or more first feature descriptors; compute, using the one or more DNNs and based at least on second sensor data obtained using at least one of the one or more first sensors or one or more second sensors of the ego-machine, a second feature map representative of one or more second feature descriptors; associate a second feature descriptor with a second object based at least on the one or more second feature descriptors; determine that the first object and the second object are a same object based at least on the first feature descriptor and the second feature descriptor; and perform one or more operations by the ego-machine based at least on the determination that the first object and the second object are the same object.

2. The at least one processor of claim 1, wherein the first sensor data is obtained using the one or more first sensors at a first timestamp, and the second sensor data is obtained using the one or more first sensors at a second timestamp.

3. The at least one processor of claim 1, wherein the first sensor data is obtained using the one or more first sensors at a same time as the second sensor data is obtained using the one or more second sensors.

4. The at least one processor of claim 1, wherein the association of the first feature descriptor with the first object includes:
computing a bounding shape based at least on the first sensor data;
determining a subset of the one or more first feature descriptors that are at least partially within the bounding shape; and
generating the first feature descriptor using the subset.

5. The at least one processor of claim 4, wherein the generating the first feature descriptor using the subset includes averaging values corresponding to the subset of the one or more first feature descriptors.

6. The at least one processor of claim 4, wherein the computing the bounding shape is executed using at least one of: the one or more DNNs, one or more other DNNs, or an object detection algorithm.

7. The at least one processor of claim 1, wherein the one or more operations include tracking the same object.

8. The at least one processor of claim 1, wherein each first feature descriptor of the one or more first feature descriptors and each second feature descriptor of the one or more second feature descriptors are represented using a one-dimensional feature vector.

9. The at least one processor of claim 1, wherein the one or more DNNs are trained using a triplet loss function.

10. The at least one processor of claim 1, wherein the DNN is further trained using at least one of batch hard triplet mining or batch semi-hard triplet mining.

11. The at least one processor of claim 1, wherein the at least one processor is comprised in at least one of: a control system for an autonomous or semi-autonomous machine; a perception system for an autonomous or semi-autonomous machine; a system for performing simulation operations; a system for performing deep learning operations; a system implemented using an edge device; a system implemented using a robot; a system incorporating one or more virtual machines (VMs); a system implemented at least partially in a data center; or a system implemented at least partially using cloud computing resources.

12. A system comprising: one or more processing units to execute operations comprising: computing, using one or more deep neural networks (DNNs) and based at least on first sensor data obtained using one or more first sensors of an ego-machine, one or more first feature vectors; associating a first feature vector with a first object using the one or more first feature vectors; computing, using the one or more DNNs and based at least on second sensor data obtained using the one or more first sensors or one or more second sensors of the ego-machine, one or more second feature vectors; associating a second feature vector with a second object based at least on the one or more second feature vectors; defining the first object and the second object as a same object based at least on the first feature vector and the second feature vector; and performing one or more operations by the ego-machine based at least on the first object and the second object being defined as the same object.

13. The system of claim 12, wherein the first sensor data is obtained using the one or more first sensors at a first time, and the second sensor data is obtained using the one or more first sensors at a second time.

14. The system of claim 12, wherein the first sensor data is obtained using the one or more first sensors at a time, and the second sensor data is obtained using the one or more second sensors at the time.

15. The system of claim 12, wherein the association of the first feature vector with the first object includes:
computing a bounding shape based at least on the first sensor data;
determining a subset of the one or more first feature vectors that are at least partially within the bounding shape; and
generating the first feature vector using the subset.

16. The system of claim 15, wherein the generating the first feature vector using the subset includes averaging values corresponding to the subset of the one or more first feature vectors.

17. The system of claim 12, wherein: the operations further comprise computing a distance between the first feature vector and the second feature vector; and the defining the first object and the second object as the same object is based at least on the distance being less than a threshold distance.

18. The system of claim 17, wherein the computing the distance is executed using at least one of a cosine distance, an L1 distance, an L2 distance, or a K nearest neighbor (KNN) distance.

19. The system of claim 12, wherein the system is comprised in at least one of
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

20. A processor comprising: one or more circuits to: track an object across two or more sensor frames represented by sensor data obtained using one or more sensors of an ego-machine, the tracking being based at least on: determining a first feature vector associated with a first object in one or more first sensor frames is within a threshold similarity to a second feature vector associated with a second object in one or more second sensor frames, wherein the first feature vector and the second feature vector are computed using one or more deep neural networks (DNNs), and identifying the first object and the second object as the object based at least on the first feature vector and the second feature vector being within the threshold similarity; and perform one or more operations by the ego-machine based at least on the first object and the second object being identified as the object.

* * * * *